(12) United States Patent
Lv et al.

(10) Patent No.: US 11,309,745 B2
(45) Date of Patent: Apr. 19, 2022

(54) WIRELESS CHARGING DEVICE AND ELECTRONIC DEVICE

(71) Applicant: BOE TECHNOLOGY GROUP CO., LTD., Beijing (CN)

(72) Inventors: Xuewen Lv, Beijing (CN); Xiying Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 793 days.

(21) Appl. No.: 16/301,526

(22) PCT Filed: Feb. 8, 2018

(86) PCT No.: PCT/CN2018/075782
§ 371 (c)(1),
(2) Date: Nov. 14, 2018

(87) PCT Pub. No.: WO2019/000958
PCT Pub. Date: Jan. 3, 2019

(65) Prior Publication Data
US 2021/0234407 A1   Jul. 29, 2021

(30) Foreign Application Priority Data
Jun. 26, 2017   (CN) .......................... 201710495398.4

(51) Int. Cl.
*H02J 50/30* (2016.01)
*H02J 50/00* (2016.01)
*F21V 8/00* (2006.01)

(52) U.S. Cl.
CPC ............ *H02J 50/30* (2016.02); *G02B 6/0031* (2013.01); *G02B 6/0055* (2013.01); *H02J 50/005* (2020.01); *H02J 2310/22* (2020.01)

(58) Field of Classification Search
CPC ...... H02J 50/30; H02J 50/005; H02J 2310/22; G02B 6/0031; G02B 6/0055; G02B 6/0028; G02B 6/0036
See application file for complete search history.

(56) References Cited

U.S. PATENT DOCUMENTS

| | | | |
|---|---|---|---|
| 2015/0041598 A1* | 2/2015 | Nugent | B64C 39/022 244/53 R |
| 2016/0359330 A1* | 12/2016 | Jin | H02J 50/50 |
| 2017/0018976 A1 | 1/2017 | Mor et al. | |
| 2019/0334389 A1* | 10/2019 | Kim | G02B 27/14 |

FOREIGN PATENT DOCUMENTS

| | | |
|---|---|---|
| CN | 202432373 U | 9/2012 |
| CN | 203232658 U | 10/2013 |
| CN | 105911730 A | 8/2016 |
| CN | 106352903 A | 1/2017 |
| CN | 106502001 A | 3/2017 |
| CN | 107248787 A | 10/2017 |
| CN | 107565712 A | 1/2018 |

OTHER PUBLICATIONS

International Search Report and Written Opinion dated May 8, 2018; PCT/CN2018075782.

* cited by examiner

*Primary Examiner* — Daniel Cavallari

(57) ABSTRACT

A wireless charging device and an electronic device are disclosed. The wireless charging device includes: a photoelectric conversion device and a primary light guide plate; the primary light guide plate having a first light incident surface and a first light exiting surface; and the photoelectric conversion device faces the first fight exiting surface.

16 Claims, 4 Drawing Sheets

WIRELESS CHARGING DEVICE AND ELECTRONIC DEVICE

CROSS-REFERENCE TO RELATED APPLICATIONS

The present application claims priority of Chinese Patent Application No. 201710495398.4 filed on Jun. 26, 2017, the disclosure of which is incorporated herein by reference in its entirety as part of the present application.

TECHNICAL FIELD

Embodiments of the present disclosure relate to a wireless charging device and an electronic device.

BACKGROUND

With development of science and technology and improvement of people's quality of life, a wireless charging (also referred to as wireless power transmission, hereinafter referred to as wireless charging) technology is applied to more and more electric appliances and electronic devices. For example, a wireless charging function has been implemented in some mobile phones.

The wireless charging technology is mainly divided into an electric field coupling type, an electromagnetic induction type, a magnetic resonance type, a radio wave type, a photoelectric type, and the like. The wireless charging technology of the electric field coupling type has power transmitted with an induced electric field. The wireless charging technology of the electromagnetic induction type implements power transmission by using a principle of electromagnetic induction. The wireless charging technology of the magnetic resonance type is composed of an energy transmitting device (including an energy transmitting coil) and an energy receiving device (including an energy receiving coil), and adjusts the two devices to have a same frequency to implement resonance, so that they exchange energy with each other. The wireless charging technology of the radio wave type implements power transmission through a microwave transmitting device and a microwave receiving device.

SUMMARY

At least one embodiment of the present disclosure provides a wireless charging device and an electronic device. The wireless charging device includes: a photoelectric conversion device and a primary light guide plate. The primary light guide plate, has a first light incident surface and a first light exiting surface; the photoelectric conversion device faces the first light exiting surface.

At least one embodiment of the present disclosure provides a wireless charging device, including: a photoelectric conversion device; and a primary light guide plate, having a first light incident surface and a first light exiting surface; wherein the photoelectric conversion device faces the first light exiting surface.

For example, in the wireless charging device provided by an embodiment of the present disclosure, the wireless charging device further includes: a primary beam splitting device, having a second light incident surface and a second light exiting surface, the second light exiting surface faces the first light incident surface of the primary light guide plate, and the primary beam splitting device is configured to convert a single beam transmitted to the second light incident surface into a plurality of beams that propagate toward the first light incident surface of the primary light guide plate.

For example, in the wireless charging device provided by an embodiment of the present disclosure, the wireless charging device further includes: at least one auxiliary light guide plate, having a third light incident surface and a third light exiting surface; at least one auxiliary beam splitting device, having a fourth light incident surface and a fourth light exiting surface; and at least one auxiliary photoelectric conversion device, the at least one auxiliary light guide plate is provided in one-to-one correspondence with the at least one auxiliary beam splitting device; the third light exiting surface of each of the at least one auxiliary light guide plate faces the forth light incident surface of a corresponding one of the at least one auxiliary beam splitting device; the at least one auxiliary photoelectric conversion device faces the third light emitting surface, the primary beam splitting device includes a light transmission film, the auxiliary beam splitting device includes a light receiving film, and the light transmission film is configured to reflect a portion of light beam in the primary beam splitting device to the light receiving film.

For example, in the wireless charging device provided by an embodiment of the present disclosure, the primary beam splitting device further includes: a reflective film; and at least one transflective film, the at least one transflective film and the reflective film are sequentially provided in a direction perpendicular to the second light incident surface, and the reflective film is provided at an end portion away from the second light incident surface.

For example, in the wireless charging device provided by an embodiment of the present disclosure, the primary light guide plate includes a plurality of the first light exiting surfaces, the wireless charging device includes a plurality of photoelectric conversion devices, and the plurality of photoelectric conversion devices are provided in one-to-one correspondence with the plurality of first light exiting surfaces.

For example, in the wireless charging device provided by an embodiment of the present disclosure, an area of the first light exiting surface is equal to an area of the photoelectric conversion device.

For example, in the wireless charging device provided by an embodiment of the present disclosure, the first light exiting surface is provided with a plurality of mesh points thereon.

For example, in the wireless charging device provided by an embodiment of the present disclosure, the wireless charging device further including: a plurality of lenses, provided on the second light exiting surface of the primary beam splitting device, wherein the plurality of lenses are respectively provided in one-to-one correspondence with the at least one transflective film and the reflective film.

For example, in the wireless charging device provided by an embodiment of the present disclosure, the at least one transflective film include a plurality of transflective films, the plurality of transflective films are sequentially provided in the direction perpendicular to the second light incident surface, and reflectance of the plurality of transflective films increases with an increasing distance from the second light incident surface.

For example, in the wireless charging device provided by an embodiment of the present disclosure, the at least one transflective film and the reflective film are parallel with each other.

For example, in the wireless charging device provided by an embodiment of the present disclosure, the reflective film and the second light incident surface have an angle of 45 degrees therebetween.

For example, in the wireless charging device provided by an embodiment of the present disclosure, the wireless charging device further includes: a coupler, provided on the second light incident surface of the primary beam splitting device and configured to receive a light beam.

For example, in the wireless charging device provided by an embodiment of the present disclosure, the wireless charging device further includes: an optical film, provided on a side of the first light exiting surface close to the photoelectric conversion device and configured to improve uniformity of emergent light of the first light exiting surface.

For example, in the wireless charging device provided by an embodiment of the present disclosure, the wireless charging device further includes: a light emitting device, configured to convert an electrical energy into a light beam and emit the light beam to the second light incident surface.

At least one embodiment of the present disclosure provides an electronic device, including the wireless charging device according to any one of claims 1 to 14.

For example, in the wireless charging device provided by an embodiment of the present disclosure, the wireless charging device further including: a battery, electrically connected with the wireless charging device and configured to store an electrical energy converted by the wireless charging device.

BRIEF DESCRIPTION OF THE DRAWINGS

In order to clearly illustrate the technical solution of embodiments of the present disclosure, the drawings of the embodiments or related technical description will be briefly described in the following; it is obvious that the drawings in the description are only related to some embodiments of the present disclosure and not limited to the present disclosure.

DETAILED DESCRIPTION

Figure 1:
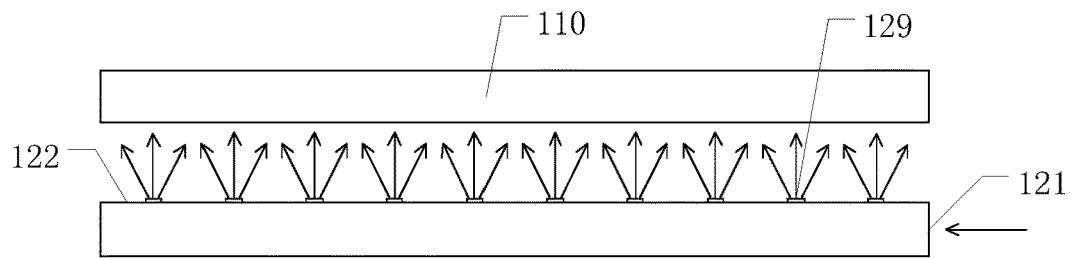
FIG. 1 is a schematic side-view of a wireless charging device provided by an embodiment of the present disclosure.

In order to make objects, technical details and advantages of the embodiments of the present disclosure apparently, the technical solutions of the embodiments will be described in a clearly and fully understandable way in connection with the drawings related to the embodiments of the present disclosure. It is obvious that the described embodiments are just a part but not all of the embodiments of the present disclosure. Based on the described embodiments herein, a person having ordinary skill in the art may obtain other embodiment(s), without any inventive work, which should be within the scope of the disclosure.

Unless otherwise defined, the technical terms or scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "includes," "including," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

With continuous development of technology, large display devices such as televisions and other electrical devices also have a need for wireless charging. However, a wireless charging technology of an electric field coupling type utilizes an induced electric filed to transmit power, which has a relatively strong misalignment resistance capability, but needs to boost to enhance a transmission capability, so it is not safe. A wireless charging technology of an electromagnetic induction type implements power transmission by using a principle of electromagnetic induction, and it has a relatively short transmission distance, with a maximum distance of only a few centimeters. A wireless charging technology of a magnetic resonance type includes an energy transmitting device and an energy receiving device, and adjusts the two devices to have a same frequency to implement resonance, so as to exchange energy with each other; however, the wireless charging technology in this mode requires a relatively large coil, and has relatively strong electromagnetic radiation. A wireless charging technology of a radio wave type implements power transmission through a microwave transmitting device and a microwave receiving device, but has relatively low efficiency.

A photoelectric wireless charging technology utilizes a light source as an energy transmitting device, and converts light energy into electrical energy with a photoelectric conversion device. However, a conventional photoelectric wireless charging technology utilizes an ordinary light source as the energy transmitting device, and energy per unit area illuminating on the photoelectric conversion device is relatively small, so power generated is often relatively small as well. A large display device such as a television requires a larger amount of power; if a large display device such as a television is to be driven, the conventional photoelectric wireless charging technology requires a photoelectric conversion device with a very large area, and is more costly and impractical.

Inventor(s) of the present disclosure thought of using a light source having higher luminance (for example, a laser light source) as the energy transmitting device of the photoelectric wireless charging technology. However, because the photoelectric conversion device has limit illuminance, that is, if illuminance of light on the photoelectric conversion device is higher than the limit illuminance, efficiency of the photoelectric conversion device converting the light energy into the electric energy does not increase, but tends to be saturated. If a laser light source is used as the energy transmitting device to directly illuminate the photoelectric conversion device, energy is wasted, resulting in lower energy utilization efficiency, and in a thermal effect on the photoelectric conversion device, which damages or even burns the photoelectric conversion device.

The embodiments of the present disclosure provide a wireless charging device and an electronic device including the wireless charging device. The wireless charging device includes: a photoelectric conversion device and a primary light guide plate; the primary light guide plate having a first light incident surface and a first light exiting surface; and the photoelectric conversion device faces the first light exiting surface. Therefore, the wireless charging device can utilize a light source with higher luminance (for example, a laser) as a source of energy, to enable the photoelectric conversion device to achieve higher power, so as to reduce an area occupied by the wireless charging device. Upon a light source with higher luminance (for example, a laser) is used as the source of energy, luminance of the laser is reduced to limit illuminance of the photoelectric conversion device through the primary light guide plate, so as to improve energy utilization efficiency.

Hereinafter, the wireless charging device and the electronic device provided by the embodiments of the present disclosure will be described with reference to the accompanying drawings.

An embodiment of the present disclosure provides a wireless charging device. FIG. 1 shows a wireless charging device according to the present embodiment. As illustrated by FIG. 1, the wireless charging device includes a photoelectric conversion device 110 and a primary light guide plate 120. The primary light guide plate 120 has a first light incident surface 121 and a first light exiting surface 122. The photoelectric conversion device 110 faces the first light exiting surface 122. For example, as illustrated by FIG. 1, the photoelectric conversion device 110 may be provided at a certain distance from the first light exiting surface 122. It should be noted that, that the above-described photoelectric conversion device faces the first light exiting surface refers to that light exited from the first light exiting surface may illuminate on the photoelectric conversion device, and an orthogonal projection of the photoelectric conversion device on the first light exiting surface is at least partially overlapped or even completely overlapped with the first light exiting surface.

The wireless charging device provided by the present embodiment can utilize a light source with higher luminance, for example, a laser, as an energy transmitting device, to enable the photoelectric conversion device to achieve higher power, so as to reduce an area occupied by the wireless charging device. Upon a light source with higher luminance, for example, a laser, is used as the source of energy, luminance of the laser is reduced to limit illuminance of the photoelectric conversion device through the primary light guide plate, so as to improve energy utilization efficiency, and prevents the laser from generating a thermal effect on the photoelectric conversion device, damaging and even burning the photoelectric conversion device.

For example, as illustrated by FIG. 1, the primary light guide plate 110 may be a light guide plate of a side-lit type, that is, the first light incident surface 121 is located on a side of the primary light guide plate 110, and the first light exiting surface 122 is located on a main surface of the primary light guide plate 110. Of course, the embodiments of the present disclosure include, but are not limited thereto, and the primary light guide plate may also be a light guide plate of other type.

It should be noted that, in a case where the primary light guide plate is a light guide plate of the side-lit type, the wireless charging device can utilize a light source having a long strip shape and higher luminance, which faces the first light incident surface, as an energy transmitting device, and can also utilize a plurality of point light sources (for example, a plurality of laser light sources) having higher luminance and arranged in a long strip shape, as the energy transmitting device.

In some examples, the first light exiting surface 122 of the primary light guide plate 110 is provided with a plurality of mesh points 129 thereon, such that exited light of the first light exiting surface is sufficiently scattered.

In some examples, except the first light incident surface and the first light exiting surface, other surfaces of the primary light guide plate may be provided with a reflective film or a reflective plate (not shown), so as to improve utilization efficiency of light incident into the primary light guide plate.

In some examples, an area of the first light exiting surface is equal to or substantially equal to an area of the photoelectric conversion device. Thus, a case where some regions on the photoelectric conversion device are not illuminated may be avoided, and a utilization ratio of the photoelectric conversion device is improved.

Figure 2A:
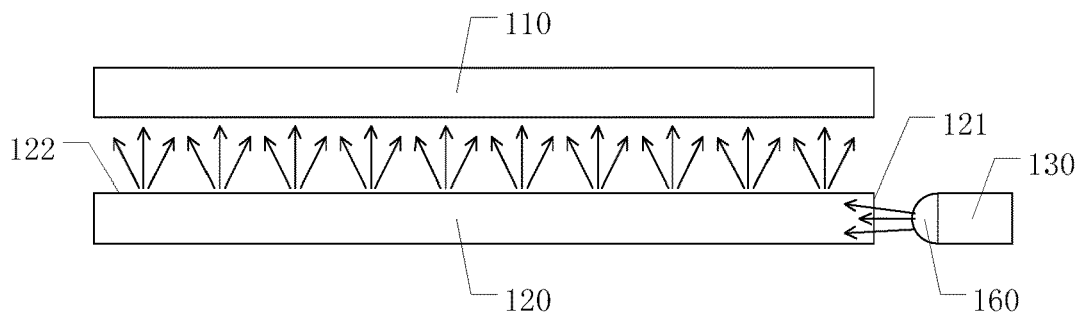
FIG. 2A is a schematic side-view of another wireless charging device provided by the embodiment of the present disclosure.
Figure 2B:
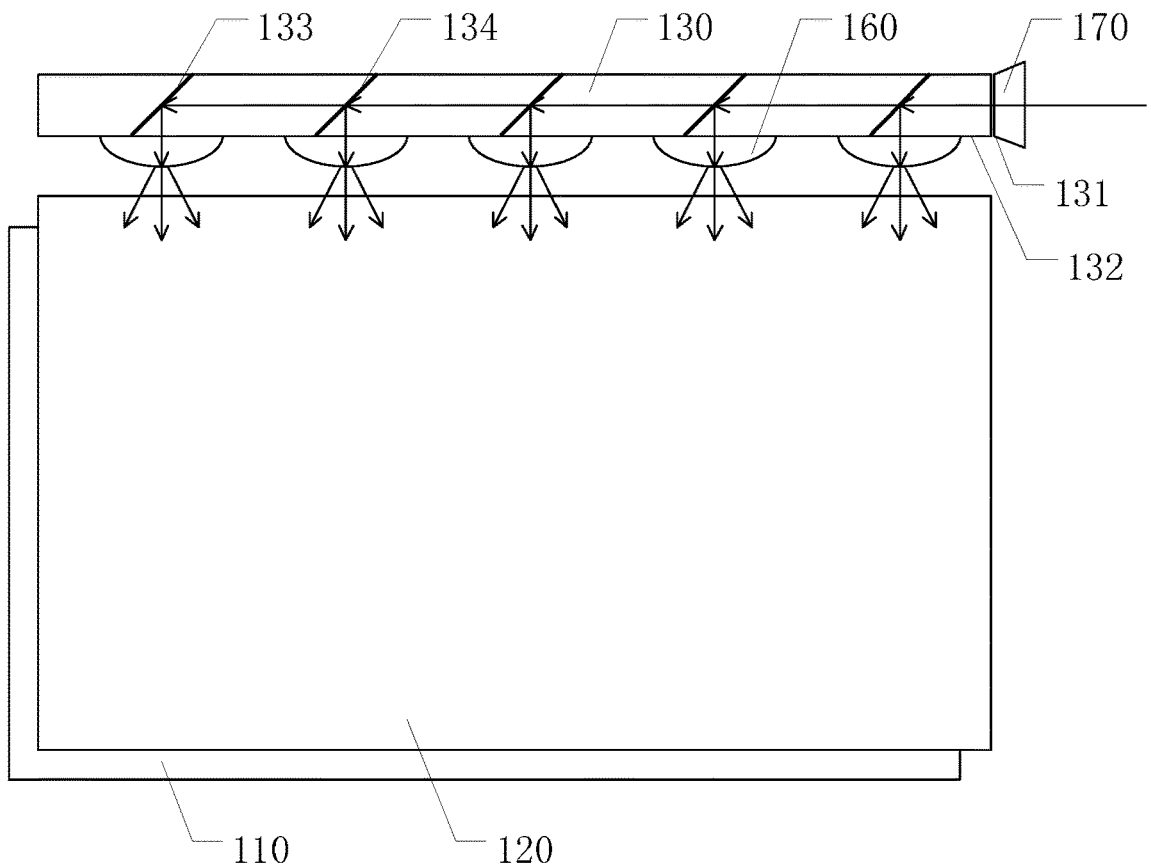
FIG. 2B is a schematic top-view of the wireless charging device provided by the embodiment of the present disclosure.

FIG. 2A and FIG. 2B show another wireless charging device according to the present embodiment. As illustrated by FIG. 2A and FIG. 2B, the wireless charging device further includes a primary beam splitting device 130. The primary beam splitting device 130 has a second light incident surface 131 and a second light exiting surface 132; the second light exiting surface 132 faces the first light incident surface 121 of the primary light guide plate 120, and the primary beam splitting device 130 can convert a laser beam transmitted to the second light incident surface 131 into a plurality of beams that propagate toward the first light incident surface 121 of the primary light guide plate 120. Thus, the wireless charging device may split a single beam having higher luminance into a plurality of beams through the primary beam splitting device, and then convert the plurality of beams into a surface light source through the primary light guide plate, so as to further reduce luminance of light illuminating on the photoelectric conversion device. Therefore, the wireless charging device can utilize a light beam having higher luminance, for example, a laser beam. As long as areas of the light guide plate and the photoelectric conversion device are sufficiently large, a large power output may be implemented with a very narrow laser beam. Moreover, because the wireless charging device can utilize a single beam, a volume of the light source as the energy transmitting device can be relatively small, so that convenience of the wireless charging device is improved.

In some examples, as illustrated by FIG. 2B, the primary beam splitting device 130 includes at least one transflective film 134. The at least one transflective film 134 is sequentially provided in a direction perpendicular to the second light incident surface 131. Thus, upon incident light from the second light incident surface passing through respective transflective films, a portion of the incident light passes through the respective transflective films, and a portion of the incident light is reflected by the respective transflective films, and is exited from the second light exiting surface, so that splitting a single beam having higher luminance into a plurality of beams may be implemented.

In some examples, in order to improve a utilization ratio of light incident from the second light incident surface 131, as illustrated by FIG. 2B, the primary beam splitting device 130 further includes a reflective film 133. The at least one transflective film 134 and the reflective film 133 are sequentially provided in the direction perpendicular to the second light incident surface 131, and the reflective film 133 is provided at an end portion away from the second light incident surface 131. That is to say, in the direction perpendicular to the second light incident surface and away from the second light incident surface, the at least one transflective film 134 and the reflective film 133 are sequentially provided. Thus, light incident from the second light incident surface 131 firstly passes through the transflective films, and finally propagates to the reflective film, and are totally reflected by the reflective film to the second light exiting surface, so as to improve the utilization ratio of light incident from the second light incident surface 131.

For example, as illustrated by FIG. 2B, centers of the at least one transflective film and the reflective film provided in the direction perpendicular to the second light incident surface are on a straight line.

In some examples, as illustrated by FIG. 2B, the at least one transflective film 134 include a plurality of transflective films 134, the plurality of transflective films 134 are sequentially provided in the direction perpendicular to the second light incident surface 131, and reflectance of the plurality of transflective films 134 increases with an increasing distance from the second light incident surface 131. Thus, upon a light beam being incident in the direction perpendicular to the second light incident surface, the transflective film transmits one portion of the light beam, and reflects the other portion of the light beam toward the second light exiting surface: and therefore, luminance of light propagating in the direction perpendicular to the second light incident surface in the primary beam splitting device is gradually attenuated, and by setting the reflectance of the plurality of transflective films to increase with an increasing distance from the second light incident surface 131, uniformity of luminance of light emergent from the second light exiting surface can be improved.

For example, the primary beam splitting device may include three transflective films and one reflective film, reflectance of the reflective film is 100%, and reflectance of the three transflective films provided in the direction perpendicular to the second light incident surface may increase with an increasing distance from the second light incident surface, which, for example, may be 25%, 33.33% and 50%.

In some examples, as illustrated by FIG. 2B, at least one transflective film 134 and the reflective film 133 are parallel with each other, so that light beams reflected by the transflective film and the reflective film, and exited from the second light exiting surface are parallel to each other.

In some examples, as illustrated by FIG. 2B, the reflective film 133 and the second light incident surface 131 have an angle of 45 degrees therebetween.

It should be noted that, the above-described primary beam splitting device may include a support, as well as a transflective film and a reflective film fixed on the support, and may also include an optical wave conductor and a transflective film and a reflective film embedded in the optical wave conductor, which will not be limited in the embodiments of the present disclosure.

In some examples, as illustrated by FIG. 2B, the wireless charging device further includes a plurality of lenses 160. The plurality of lenses 160 are provided on the second light exiting surface 132 of the primary beam splitting device 130. The plurality of lenses 160 are respectively provided in one-to-one correspondence with the at least one transflective film 134 and the reflective film 133. That is to say, each transflective film 134 is provided correspondingly with a lens 160, and the reflective film 133 is also provided correspondingly with a lens 160. Thus, the plurality of lenses 160 may disperse light beams reflected by the at least one transflective film 134 and the reflective film 133 to the second light exiting surface 132. For example, the lens 160 may be a convex lens or a concave lens.

In some examples, as illustrated by FIG. 2B, the wireless charging device further includes a coupler 170. The coupler 170 is provided on the second light incident surface 131 of the primary beam splitting device 130 and is configured to receive a light beam, for example, a laser beam.

Figure 3:
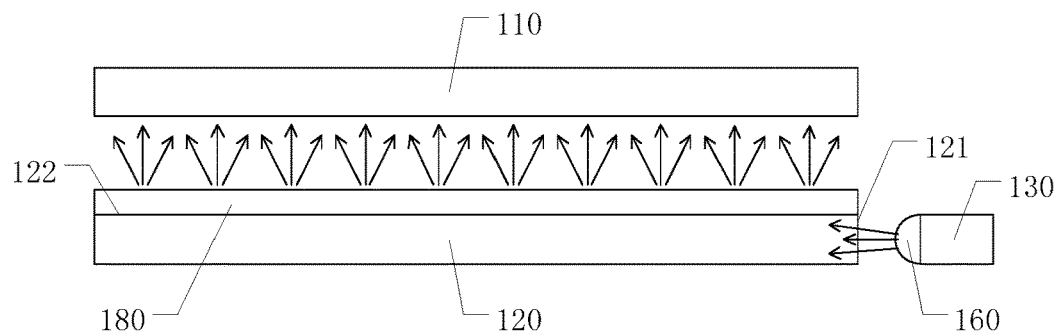
FIG. 3 is a schematic side-view of another wireless charging device provided by the embodiment of the present disclosure.

FIG. 3 shows another wireless charging device according to the present embodiment. As illustrated by FIG. 3, the wireless charging device further includes an optical film 180. The optical film 180 is provided on a side of the first light exiting surface 122 close to the photoelectric conversion device 110 and is configured to improve uniformity of exited light of the first light exiting surface 122.

For example, the optical film may include a prism film, a scattering film, a diffusion sheet, and the like.

Figure 4:
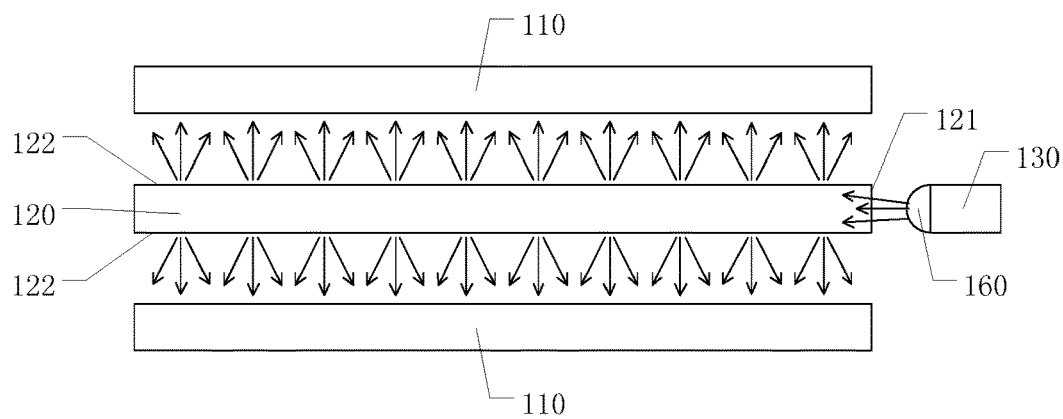
FIG. 4 is a schematic side-view of another wireless charging device provided by the embodiment of the present disclosure.

FIG. 4 shows another wireless charging device according to the present embodiment. As illustrated by FIG. 4, the primary light guide plate 120 includes a plurality of first light exiting surfaces 122, the wireless charging device includes a plurality of photoelectric conversion devices 110, and the plurality of photoelectric conversion devices 110 are provided in one-to-one correspondence with the plurality of first light exiting surfaces 122. The photoelectric conversion device 110 faces the first light exiting surface 122. Each of the photoelectric conversion devices 110 and a corresponding one of the first light exiting surfaces 122 faces with each other.

Thus, by providing the plurality of first light exiting surfaces on the primary light guide plate, on the one hand, in a case where luminance of light source as the energy transmitting device is constant, luminance of light illuminating on the photoelectric conversion device through each first light exiting surface may be further reduced; on the other hand, in a case where it is ensured that luminance of light illuminating on the photoelectric conversion device is substantially equal to the limit illuminance, a light source having higher luminance can be further used as the energy transmitting device. Therefore, the wireless charging device further improves the utilization efficiency of energy on the one hand; on the other hand, reduces the area occupied by the wireless charging device, and improves convenience of the wireless charging device.

For example, as illustrated by FIG. 4, the primary light guide plate 120 is the light guide plate of the side-lit type, and the primary light guide plate 120 includes two first light exiting surfaces 122, that is, two main surfaces of the primary light guide plate 120 are the first light exiting surfaces 122.

Figure 5:
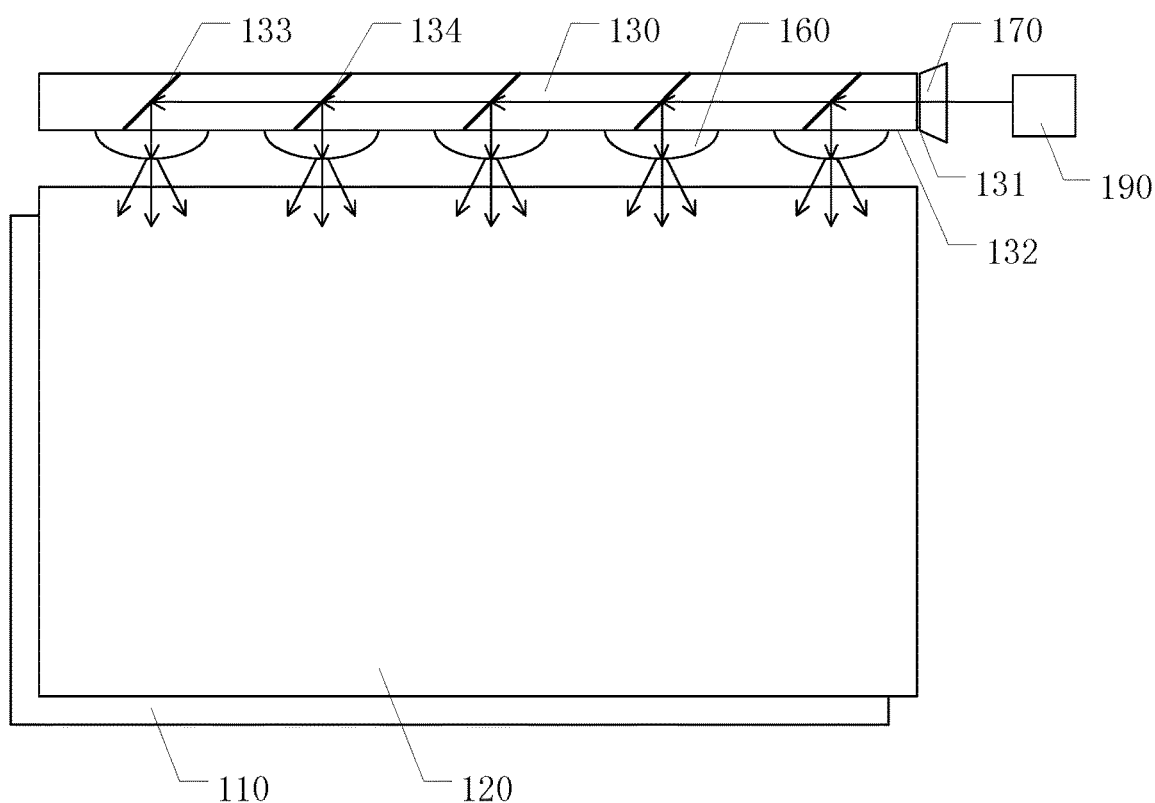
FIG. 5 is a schematic top-view of another wireless charging device provided by the embodiment of the present disclosure.

FIG. 5 shows another wireless charging device according to the present embodiment. As illustrated by FIG. 5, the wireless charging device further includes a light emitting device 190 for converting an electrical energy into a light beam and emitting the light beam to the second light incident surface or the coupler, and light generated by the light emitting device 190 has luminance greater than 6000 lx. Thus, the light emitting device 190 may serve as the energy transmitting device of the wireless charging device. For example, the light emitting device 190 may be a laser device.

Figure 6A:
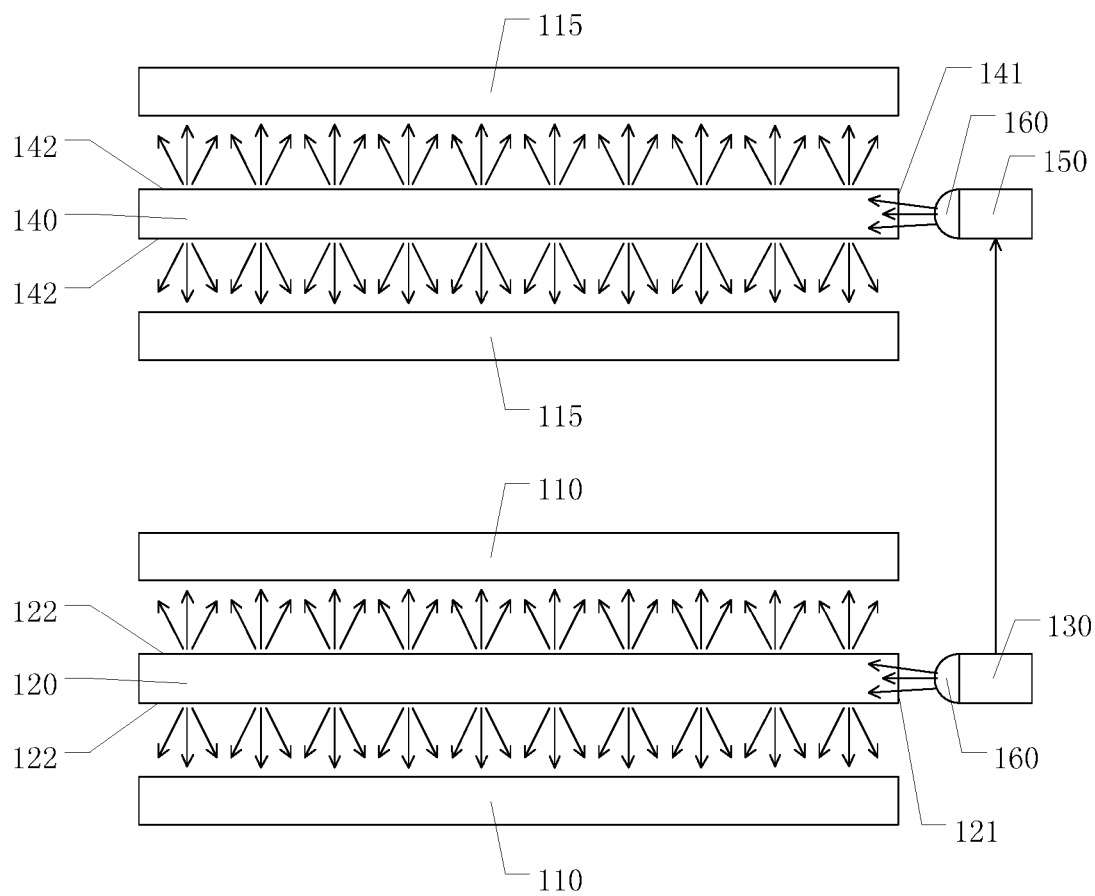
FIG. 6A is a schematic side-view of another wireless charging device provided by an embodiment of the present disclosure.
Figure 6B:
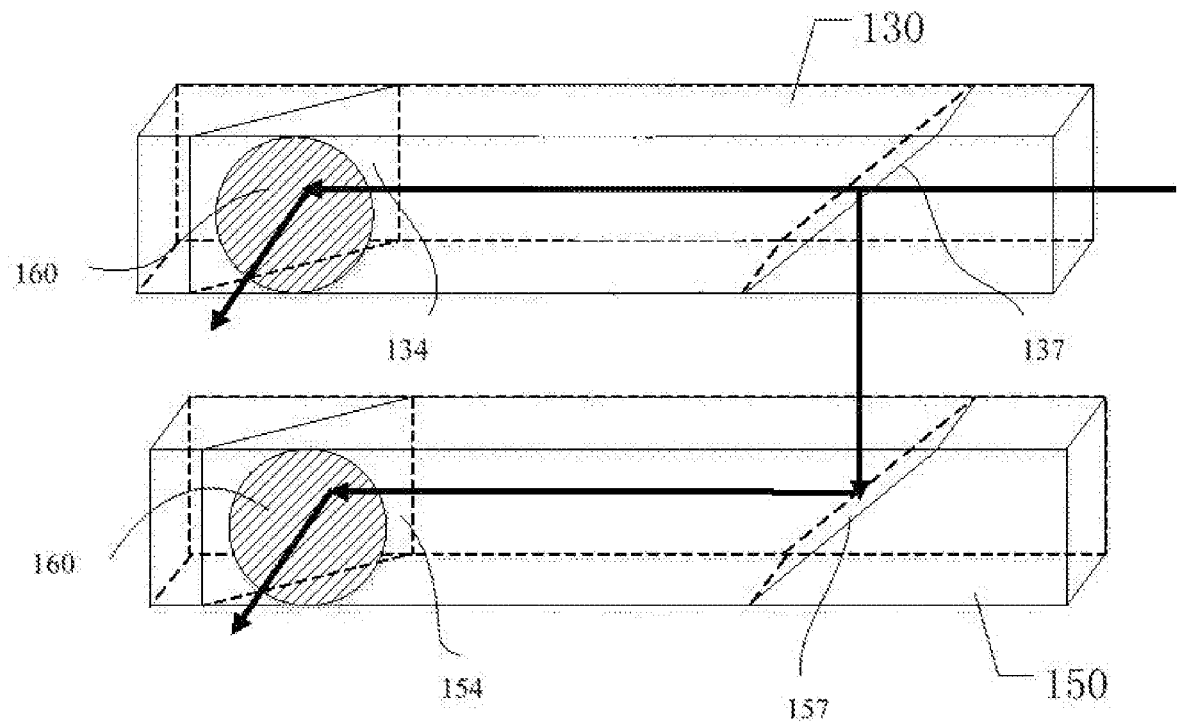
FIG. 6B is a schematic structural diagram of a primary beam splitting device and an auxiliary beam splitting device provided by the embodiment of the present disclosure.

An embodiment of the present disclosure provides a wireless charging device. FIG. 6A shows the wireless charging device according to the present embodiment. FIG. 6B shows a primary beam splitting device and an auxiliary beam splitting device according to the present embodiment. As illustrated by FIG. 6A, the wireless charging device further includes at least one auxiliary light guide plate 140, at least one auxiliary beam splitting device 150 and at least one auxiliary photoelectric conversion device 115. The auxiliary light guide plate 140 has a third light incident surface 141 and a third light exiting surface 142. For example, the third light incident surface of the auxiliary light guide plate may be a side face thereof, and the third light exiting surface 142 may be a main surface thereof. The auxiliary beam splitting device 150 has a fourth light incident surface 151 and a fourth light exiting surface 152. The at least one auxiliary light guide plate 140 is provided in one-to-one correspondence with the at least one auxiliary beam splitting device 150; and the third light exiting surface of each of the at least one auxiliary light guide plate 140 faces the fourth light incident surface 151 of a corresponding one of the at least one auxiliary beam splitting device 150. Respective auxiliary photoelectric conversion devices face the third light exiting surface 142. That is to say, a positional relation between each auxiliary light guide plate and each auxiliary beam splitting device provided in one-to-one correspondence is the same as a positional relation between the primary light guide plate and the primary beam splitting device. A positional relation between the auxiliary photoelectric conversion device and the third light exiting surface is the same as a positional relation between the photoelectric conversion device and the first light exiting surface. As illustrated by FIG. 6B, the primary beam splitting device 130 includes a light transmission film 137, the auxiliary beam splitting device 150 includes a light receiving film 157, and the light transmission film 137 is configured to reflect a portion of light beam in the primary beam splitting device 130 to the light receiving film 157. Thus, the primary beam splitting device 130 may transmit a portion of light beam from the second light incident surface 131 to the auxiliary beam splitting device 150, and the auxiliary beam splitting device 150 and the auxiliary light guide plate 140 further disperse the portion of light beam, to illuminate on the auxiliary photoelectric conversion device 115. It should be noted that, in addition to the light transmission film, a structure of the auxiliary beam splitting device 150 is similar to that of the primary beam splitting device 130, that is, it also includes at least one transflective film 154 and a reflective film (not shown) sequentially provided in the direction perpendicular to the fourth light incident surface. In addition, the light transmission film may be a transflective film, and the light receiving film may be a reflective film.

In the wireless charging device provided by the present embodiment, the auxiliary light guide plate, the auxiliary beam splitting device and the auxiliary photoelectric conversion device provided correspondingly may constitute an auxiliary charging group, and a light beam incident from the second light incident surface is further dispersed through the primary beam splitting device. on the one hand, in a case where luminance of the light source as the energy transmitting device is constant, the luminance of light illuminating on the photoelectric conversion device and the auxiliary photoelectric conversion device can be reduced; on the other hand, in a case where it is ensured that luminance of light illuminating on the photoelectric conversion device and the auxiliary photoelectric conversion device is substantially equal to the limit illuminance, a light source having higher luminance as the energy transmitting device can be utilized. Therefore, the wireless charging device further improves the utilization efficiency of energy on the one hand; on the other hand, further reduces the area occupied by the wireless charging device, and improves convenience of the wireless charging device.

It should be noted that, the wireless charging device shown in FIG. 6A and FIG. 6B includes one auxiliary charging group, that is, includes one auxiliary light guide plate, one auxiliary beam splitting device and one auxiliary photoelectric conversion device. However, the embodiments of the present disclosure include, but are not limited thereto, and the wireless charging device provided by the present embodiment may include a plurality of auxiliary charging groups, that is, include a plurality of auxiliary light guide plates, a plurality of auxiliary beam splitting devices and a plurality of auxiliary photoelectric conversion devices.

Figure 7:
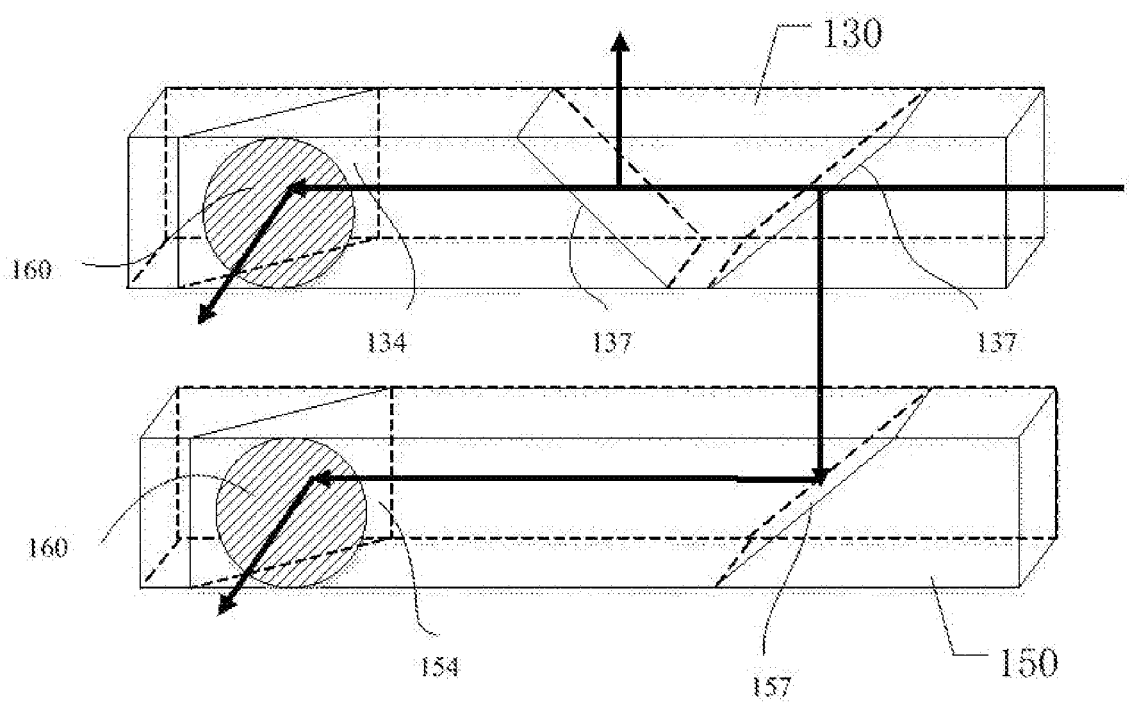
FIG. 7 is a schematic structural diagram of another primary beam splitting device and auxiliary beam splitting device provided by the embodiment of the present disclosure.

FIG. 7 shows another primary beam splitting device and auxiliary beam splitting device according to the present embodiment. As illustrated by FIG. 7, the primary beam splitting device 130 includes two light transmission films 137, and the two light transmission films 137 respectively reflect a portion of light beam in the primary beam splitting device 130 into two auxiliary beam splitting devices 150.

For example, as illustrated by FIG. 7, in a direction perpendicular to the second light incident surface 131 and away from the second light incident surface 131, the light transmission film 137 is provided in front of the transflective film 134, so that more portions of light beam incident in the primary beam splitting device may be reflected into the auxiliary beam splitting device.

For example, both the photoelectric conversion device and the auxiliary photoelectric conversion device can be formed by splicing a plurality of sub-photoelectric conversion devices.

An embodiment of the present disclosure provides an electronic device, including the wireless charging device as described in any one of the abovementioned embodiments. Therefore, the electrical device has the technical effects of the wireless charging devices provided by the abovementioned embodiments. For example, the electrical device can utilize a light source having higher luminance, for example, a laser, as an energy transmitting device, to enable the photoelectric conversion device to achieve higher power, so as to reduce an area occupied by the wireless charging device. In a case where the light source with higher luminance, for example, a laser, is used as the source of energy, luminance of the laser can be reduced to limit illuminance of the photoelectric conversion device through a primary light guide plate, so as to improve energy utilization efficiency, and prevent the laser from generating a thermal effect on the photoelectric conversion device, damaging and even burning the photoelectric conversion device.

For example, because the wireless charging device is able to generate larger power, the electronic device may be a large display device such as a television and other electronic device. Of course, the embodiments of the present disclosure include, but are not limited thereto, and the display device may further be a mobile phone, a tablet personal computer, a laptop, a navigator, and any other product having a display function.

Figure 8:
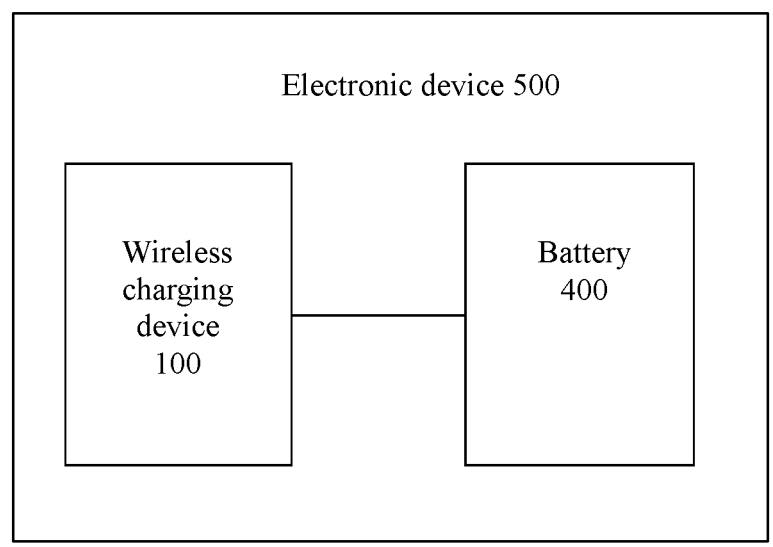
FIG. 8 is a schematic diagram of an electronic device provided by an embodiment of the present disclosure.

FIG. 8 shows an electronic device 500 according to the present embodiment. As illustrated by FIG. 8, the electronic device 500 further includes a battery 400, the battery 400 being electrically connected with a wireless charging device 100 and storing an electrical energy converted by the wireless charging device 100.

The following points should to be explained:

1) The drawings of at least one embodiment of the present disclosure only relate to the structure in the embodiment of the present disclosure, and other structures may be referenced to the usual design.

2) In the absence of conflict, the features of the same embodiment and the different embodiments ban be combined with each other.

The above are only specific implementations of the present disclosure, however the scope of the present disclosure is not limited thereto, variations or substitutions that easily occur to any one skilled in the art within the technical scope disclosed in the present disclosure should be encompassed in the scope of the present disclosure. Therefore, the scope of the present disclosure should be based on the scope of the claims.

What is claimed is:

1. A wireless charging device, comprising:
a photoelectric conversion device; and
a primary light guide plate, having a first light incident surface and a first light exiting surface;
wherein the photoelectric conversion device faces the first light exiting surface,
the wireless charging device further comprises a primary beam splitting device, having a second light incident surface and a second light exiting surface, the second light exiting surface faces the first light incident surface of the primary light guide plate, and the primary beam splitting device is configured to convert a single beam transmitted to the second light incident surface into a plurality of beams that propagate toward the first light incident surface of the primary light guide plate.

2. The wireless charging device according to claim 1, further comprising: at least one auxiliary light guide plate, having a third light incident surface and a third light exiting surface; at least one auxiliary beam splitting device, having a fourth light incident surface and a fourth light exiting surface; and at least one auxiliary photoelectric conversion device, wherein the at least one auxiliary light guide plate is provided in one-to-one correspondence with the at least one auxiliary beam splitting device; the third light exiting surface of each of the at least one auxiliary light guide plate faces the forth light incident surface of a corresponding one of the at least one auxiliary beam splitting device; the at least one auxiliary photoelectric conversion device faces the third light emitting surface, the primary beam splitting device comprises a light transmission film, the auxiliary beam splitting device comprises a light receiving film, and the light transmission film is configured to reflect a portion of light beam in the primary beam splitting device to the light receiving film.

3. The wireless charging device according to claim 2, wherein the primary beam splitting device further comprises:
a reflective film; and
at least one transflective film,
wherein the at least one transflective film and the reflective film are sequentially provided in a direction perpendicular to the second light incident surface, and the reflective film is provided at an end portion away from the second light incident surface.

4. The wireless charging device according to claim 1, wherein the primary light guide plate comprises a plurality of the first light exiting surfaces, the wireless charging device comprises a plurality of photoelectric conversion devices, and the plurality of photoelectric conversion devices are provided in one-to-one correspondence with the plurality of first light exiting surfaces.

5. The wireless charging device according to claim 1, wherein an area of the first light exiting surface is equal to an area of the photoelectric conversion device.

6. The wireless charging device according to claim 1, wherein the first light exiting surface is provided with a plurality of mesh points thereon.

7. The wireless charging device according to claim 3, further comprising:
a plurality of lenses, provided on the second light exiting surface of the primary beam splitting device,
wherein the plurality of lenses are respectively provided in one-to-one correspondence with the at least one transflective film and the reflective film.

8. The wireless charging device according to claim 3, wherein the at least one transflective film comprise a plurality of transflective films, the plurality of transflective films are sequentially provided in the direction perpendicular to the second light incident surface, and reflectance of the plurality of transflective films increases with an increasing distance from the second light incident surface.

9. The wireless charging device according to claim 3, wherein the at least one transflective film and the reflective film are parallel with each other.

10. The wireless charging device according to claim 9, wherein the reflective film and the second light incident surface have an angle of 45 degrees therebetween.

11. The wireless charging device according to claim 2, further comprising:
a coupler, provided on the second light incident surface of the primary beam splitting device and configured to receive a light beam.

12. The wireless charging device according to claim 1, further comprising:
an optical film, provided on a side of the first light exiting surface close to the photoelectric conversion device and configured to improve uniformity of emergent light of the first light exiting surface.

13. The wireless charging device according to claim 1, further comprising:
a light emitting device, configured to convert an electrical energy into a light beam and emit the light beam to the second light incident surface.

14. An electronic device, comprising the wireless charging device according to claim 1.

15. The electronic device according to claim 14, further comprising:
a battery, electrically connected with the wireless charging device and configured to store an electrical energy converted by the wireless charging device.

16. The wireless charging device according to claim 3, wherein the primary beam splitting device further comprises:
a reflective film; and
at least one transflective film,
wherein the at least one transflective film and the reflective film are sequentially provided in a direction perpendicular to the second light incident surface, and the reflective film is provided at an end portion away from the second light incident surface.

* * * * *